United States Patent Office 2,875,159
Patented Feb. 24, 1959

2,875,159
BEAD FORMING PROCESS

Henry Erickson, Park Forest, Ill., assignor to Sinclair Refining Company, New York, N. Y., a corporation of Maine No Drawing. Application June 2, 1953
Serial No. 359,210

6 Claims. (Cl. 252—448)

This invention relates to improvements in manufacture of silica gel and silica gel base cracking catalysts in bead form.

Bead form catalysts are particularly useful in bed type cracking processes of either the fixed bed or moving bed type. Silica gel beads are useful in the manufacture of cracking catalysts by incorporation of active metal oxides such as alumina or magnesia and in adsorption-desorption processes. The bead form is characterized by homogeneity of structure and smooth spherical or spheroidal shape. As a consequence the bead form is advantageous in fluid-solid contacting processes where the solid contact material is handled as a bed in particle form. The bead form particles pack well to form a homogeneous bed which minimizes channeling of fluids and promotes uniformity in contacting. In catalytic cracking, uniformity of contacting is important in terms of capacity and maximum conversion per pass and also in the regeneration cycle in terms of capacity and efficiency of regeneration. The bed form also is easy to handle and has satisfactory resistance to attrition. For example, bead form particles may be handled satisfactorily by gas or vapor lift.

The manufacture of silica gel and silica gel base particles in bead form is made difficult and expensive because the bead form particles are produced as hydrogels which must be dried and thermally treated before use, the bead form hydrogels being highly susceptible to splitting and fracturing during such drying. Consequently, it is generally understood that it is necessary to resort to expensive and complicated drying expedients to reduce breakage to a tolerable amount. For example, it is necessary to use equipment adapted to close control on a commercial scale that permits a closer control and gradual temperature rise over the drying cycle. Another expedient is illustrated in Payne Patent No. 2,472,776 which describes drying at 100 percent relative humidity and constantly increasing temperatures.

I have found that breakage of silica gel and silica gel base during drying may be reduced to a very low quantity if the bead form hydrogel is treated before drying with an aqueous solution of a surface active agent which is a polyoxyethylene ether of an alkyl phenol. According to my invention the bead form hydrogel is treated by washing or slurrying in an aqueous medium containing a small amount of the surface active agent. The treated bead form hydrogel then may be subjected to ordinary constant oven temperature drying or to controlled temperature rise drying at high rates with only a small amount of breakage occurring.

I have found that neither too little nor too much of the surface active agent must be used in treatment according to my invention or the improved resistance to breakage in drying is entirely lost. The upper limit in terms of concentration of the agent in water using the minimum amount of water to obtain a completely fluid slurry appears to be about 1.0 weight percent. The amount of agent necessary for improvement depends in general upon the nature of the agent and the solids content of the hydrogel. Ordinarily about 0.1 to 0.5 weight percent is sufficient. The concentration of agent used is based on the total water, including that contained in the hydrogel. Where the hydrogel contains about 90 percent water for example, the concentration based on solids may be obtained by multiplying by a factor of nine.

As indicated above, silica gel beads useful in adsorption processes may be profitably treated according to my invention. Mixed gels, however, of the type commonly employed in catalytic cracking processes in the petroleum industry are treated with particular advantage. Thus bead form silica alumina hydrogel, silica magnesia hydrogel or silica gel base catalysts containing mixtures of alumina and magnesia or other active ingredients such as zirconia or titania are illustrative. The silica gel base catalyst may be prepared by co-precipitation methods, by impregnation of preformed silica hydrogel beads or by incorporation of the metal oxide ingredients in finely divided form into the silica sol.

The materials are ordinarily prepared in bead form by dropping particles of the sol or partially formed gel through a column of oil. The recovered spherical particles or beads of hydrogel are washed free from inorganic materials and then are hardened by drying and finally are activated by calcination by high temperatures. According to my invention the bead form hydrogel is first treated so as to incorporate a small amount of surface active agent. For example, at the conclusion of the washing step, the bead form hydrogel is contacted with an aqueous solution of the surface active agent. Adsorption ordinarily is incomplete so that the excess solution drained from the hydrogel may be recycled to obtain maximum utilization of surface active agent.

The effectiveness of treatment according to my invention is illustrated in the following examples:

Example I

In the following treatments, 200 grams of hydrogel in bead form were covered with 100 ml. of a solution of Glim (a proprietary diamyl phenol ethoxy polymer), of Igepal CA (a proprietary para-isooctyl phenol ethoxy polymer having about nine ethylene oxide groups per molecule) or of Igepal CO (a proprietary nonyl phenol ethoxy polymer having nine ethylene oxide units per molecule). These samples were dried at 110° C. and calcined for two hours at 1050° F. The calcined beads were separated and the whole and broken beads weighed. The percentage breakage is based on the difference in the weight per cent broken beads in each sample as compared to that of the original hydrogel. The results at differing concentrations follow. The original hydrogel contained 87.1 percent whole beads.

| Agent | Percent Agent | Percent Whole beads | Percent Breakage |
|---|---|---|---|
| None | | 22.0 | 75.0 |
| Glim | 0.01 | 62.9 | 27.8 |
| Do | 0.1 | 90.6 | 0.0 |
| Do | 0.3 | 88.2 | 0.0 |
| Do | 0.5 | 78.6 | 9.8 |
| Do | 1.0 | 62.0 | 28.8 |
| Igepal CA | 0.01 | 33.1 | 62.0 |
| Do | 0.1 | 59.7 | 31.4 |
| Do | 0.3 | 63.0 | 25.4 |
| Do | 0.5 | 90.7 | 0.0 |
| Do | 1.0 | 70.0 | 19.6 |

| Agent | Percent Agent | Percent Breakage |
|---|---|---|
| Igepal CO | 0.01 | 27.8 |
| Do | 0.1 | 0.0 |
| Do | 0.3 | 0.0 |
| Do | 0.5 | 9.8 |
| Do | 1.0 | 28.8 |

Similar experiments were performed using agent 140-C (a proprietary nonyl phenol ethoxy polymer having four ethylene oxide groups per molecule), agent 140-LE (a proprietary nonyl phenol ethoxy polymer having twenty ethylene oxide groups per molecule) and agent 140-AE (a proprietary nonyl phenol ethoxy polymer having thirty ethylene oxide groups per molecule) with the following results:

| Agent | Percent Agent | Percent Breakage |
|---|---|---|
| 140-C | 0.1 | <5.0 |
| 140-LE | 0.1 | <5.0 |
| 140-AE | 0.1 | <5.0 |

*Example II*

The silica alumina bead of Example I after treatment with 0.1 weight percent of Glim (diamyl phenol ethoxy polymer) was dried, calcined and the effect on pore radius was determined by conventional nitrogen isotherm procedure. The hysteresis data follow:

| Agent | N₂ area, m.²/g. | Pore radius, A. U. |
|---|---|---|
| None | 440 | 21.8 |
| 0.1% Glim | 526 | 31.0 |

This application is a continuation-in-part of my co-pending application Serial No. 141,171, filed January 28, 1950, now U. S. Patent No. 2,643,231.

I claim:

1. The method of preparing bead form silica gel base cracking catalyst selected from the group consisting of silica alumina and silica magnesia for drying which comprises treating the bead form hydrogel with an aqueous solution of 0.1 to 0.5 weight percent of a diamyl phenol ethoxy polymer based on total water content.

2. The method of preparing bead form silica gel base cracking catalyst selected from the group consisting of silica alumina and silica magnesia for drying which comprises treating the bead form hydrogel with an aqueous solution containing from about 0.1 to about 1.0 weight percent, based on the total water content, of a non-ionic surface active agent consisting essentially of a polyoxyethylene ether of an alkyl phenol.

3. The method of preparing bead form silica gel base cracking catalyst selected from the group consisting of silica alumina and silica magnesia for drying which comprises treating the bead form hydrogel with an aqueous solution containing from about 0.1 to about 1.0 weight percent, based on the total water content, of a non-ionic surface-active agent consisting essentially of a polyoxyethylene ether of an alkyl phenol wherein the alkyl group of said alkyl phenol contains 5 to 9 carbon atoms and said ether contains 4 to 30 ethylene oxide groups per molecule.

4. The method of claim 3 wherein said aqueous solution contains from 0.1 to 0.5 weight percent of an isooctyl phenol ethoxy polymer.

5. The method of claim 3 wherein said aqueous solution contains from about 0.1 to 0.5 weight percent of a nonyl phenol ethoxy polymer.

6. The method of claim 3 wherein said aqueous solution contains about 0.1 to 0.5 weight percent of said non-ionic surface-active agent.

References Cited in the file of this patent
UNITED STATES PATENTS

| | | |
|---|---|---|
| 2,213,477 | Steindorff | Sept. 3, 1940 |
| 2,490,260 | Ehrhardt | Dec. 6, 1949 |
| 2,496,396 | Kassel | Feb. 7, 1950 |
| 2,503,913 | Kimberlin et al. | Apr. 11, 1950 |
| 2,532,497 | Hoekstra | Dec. 9, 1950 |
| 2,643,231 | Erickson | June 23, 1953 |
| 2,672,452 | Wankat | Mar. 16, 1954 |